United States Patent
Masuda

(10) Patent No.: US 10,176,825 B2
(45) Date of Patent: Jan. 8, 2019

(54) ELECTRONIC APPARATUS, CONTROL METHOD, AND COMPUTER PROGRAM

(71) Applicant: Kabushiki Kaisha Toshiba, Minato-ku, Tokyo (JP)

(72) Inventor: Shinsuke Masuda, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/056,831

(22) Filed: Feb. 29, 2016

(65) Prior Publication Data

US 2016/0180861 A1 Jun. 23, 2016

Related U.S. Application Data

(63) Continuation of application No. PCT/JP2013/084997, filed on Dec. 26, 2013.

(51) Int. Cl.
    *G10L 21/028*   (2013.01)
    *G10L 21/0316*  (2013.01)
    (Continued)

(52) U.S. Cl.
    CPC .......... *G10L 21/028* (2013.01); *G10L 15/265* (2013.01); *G10L 17/005* (2013.01);
    (Continued)

(58) Field of Classification Search
    CPC .............. G10L 21/0207; G10L 21/0356; G10L 21/028; G10L 21/02; G10L 21/0208;
    (Continued)

(56) References Cited

U.S. PATENT DOCUMENTS

| | | | | |
|---|---|---|---|---|
| 5,827,990 A | * | 10/1998 | Fujita | G10H 1/365 434/307 A |
| 6,788,337 B1 | * | 9/2004 | Fujii | H04N 7/142 348/14.08 |

(Continued)

FOREIGN PATENT DOCUMENTS

| | | |
|---|---|---|
| JP | 2006-093918 A | 4/2006 |
| JP | 2010-010780 A | 1/2010 |

(Continued)

OTHER PUBLICATIONS

International Search Report mailed by Japan Patent Office dated Apr. 8, 2014 in the corresponding PCT Application No. PCT/JP2013/084997—9 pages.
Written Opinion mailed by Japan Patent Office dated Apr. 8, 2014 in the corresponding PCT Application No. PCT/JP2013/084997 (Japanese language only)—7 pages.

*Primary Examiner* — Qi Han
(74) *Attorney, Agent, or Firm* — Knobbe, Martens, Olson & Bear, LLP

(57) ABSTRACT

In general, according to one embodiment, an electronic apparatus includes a sound source separation processor and an audio controller. The sound source separation processor is configured to perform a sound source separation function that separates an input audio signal into a voice signal and a background sound signal and emphasizes either the voice signal or the background sound signal. The audio controller is configured to control, based on scene information relating to a scene included in video, performance of the sound source separation function during display of the scene.

6 Claims, 6 Drawing Sheets

(51) Int. Cl.
*G10L 21/0356* (2013.01)
*H04R 3/04* (2006.01)
*G10L 15/26* (2006.01)
*G10L 17/00* (2013.01)
*H04N 21/439* (2011.01)
*H04N 21/488* (2011.01)
*H04R 5/04* (2006.01)

(52) U.S. Cl.
CPC ...... *G10L 21/0316* (2013.01); *G10L 21/0356* (2013.01); *H04N 21/4394* (2013.01); *H04N 21/4884* (2013.01); *H04R 3/04* (2013.01); *H04R 5/04* (2013.01); *H04R 2430/01* (2013.01); *H04R 2430/03* (2013.01); *H04R 2499/11* (2013.01); *H04R 2499/15* (2013.01)

(58) Field of Classification Search
CPC ... G10L 21/0308; G10L 21/057; G10L 19/00; G10L 19/028; G10L 19/22; G10L 19/26; G10L 19/265
USPC ............ 704/225, 226, 278, 500, 501, 504; 707/225, 226, 278, 500, 501, 504
See application file for complete search history.

(56) References Cited

U.S. PATENT DOCUMENTS

| | | | |
|---|---|---|---|
| 8,494,338 | B2 | 7/2013 | Murabayashi |
| 2005/0060142 | A1* | 3/2005 | Visser ............... G10L 21/0208 704/201 |
| 2006/0009702 | A1* | 1/2006 | Iwaki .................. A61B 5/00 600/520 |
| 2006/0059510 | A1* | 3/2006 | Huang ................ H04N 19/87 725/32 |
| 2008/0226256 | A1* | 9/2008 | Ljolje .................. H04N 5/765 386/222 |
| 2010/0004928 | A1* | 1/2010 | Yonekubo ............ G10L 25/78 704/233 |
| 2010/0008641 | A1 | 1/2010 | Murabayashi |
| 2011/0274406 | A1* | 11/2011 | Kashiwagi ........ G06K 9/00711 386/224 |

FOREIGN PATENT DOCUMENTS

| | | |
|---|---|---|
| JP | 2011-069948 A | 4/2011 |
| JP | 2013-050604 A | 3/2013 |
| JP | 2013-121096 A | 6/2013 |

\* cited by examiner

| PREFERENCE SETTING | |
|---|---|
| FAVORITE CHARACTERS: | XXX XXX |
| | YYY YYY |
| NOT-FAVORITE CHARACTERS: | AAA AAA |
| | BBB BBB |

ELECTRONIC APPARATUS, CONTROL METHOD, AND COMPUTER PROGRAM

CROSS-REFERENCE TO RELATED APPLICATIONS

This application is a continuation of International Application No. PCT/JP2013/084997, filed on Dec. 26, 2013, the entire contents of which are incorporated herein by reference.

FIELD

Embodiments described herein relate generally to an electronic apparatus, a control method, and a computer program.

BACKGROUND

Sound source separation techniques have lately been developed. These techniques separate, with respect to video audio, an audio signal according to a sound source having a unique attribute to thereby perform an appropriate audio correction of the audio signal by each sound source before synthesizing and outputting the audio signal by each sound source.

Such a sound source separation technique typically separates the audio signal into a voice component that represents human voice and a background component that represents sound other than the human voice. The voice component and the background sound component are then individually subjected to emphasis control of, for example, volume to thereby achieve effects of, for example, making the human voice easier to catch or suppressing the human voice.

With the aim of, for example, making mainly the human voice easier to catch, a sound source separation function may be mounted on an electronic apparatus of a television set, a personal computer (PC), or a tablet terminal. In such cases, a need exists for achieving optimum effects of the sound source separation under an appropriate condition without any burden on a user.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic apparatus comprises a sound source separation processor and an audio controller. The sound source separation processor is configured to perform a sound source separation function that separates an input audio signal into a voice signal and a background sound signal and emphasizes either the voice signal or the background sound signal. The audio controller is configured to control, based on scene information relating to a scene included in video, performance of the sound source separation function during display of the scene.

The embodiments to be described hereunder represent an exemplary television set to which an electronic apparatus is applied. The embodiments are not, however, limited to the application of the electronic apparatus to the television set. The electronic apparatus can be applied, for example, to any device that can output audio, including a PC and a tablet terminal.

First Embodiment

Figure 1:
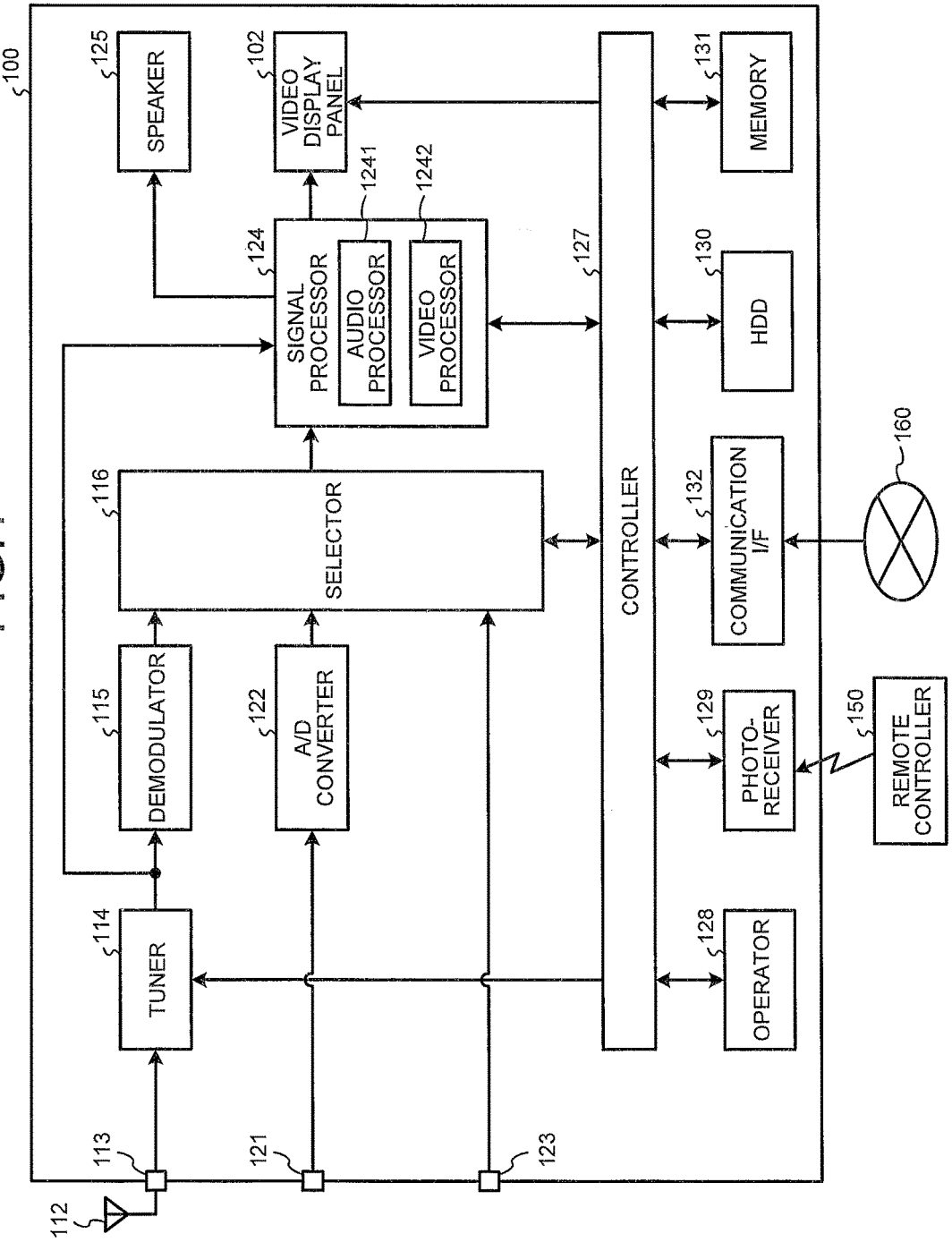
FIG. 1 is an exemplary block diagram of a configuration of a television set according to a first embodiment.

As illustrated in FIG. 1, a television set 100 in a first embodiment is a stationary video display apparatus that receives broadcast waves of digital broadcasting and displays videos of programs using video signals extracted from the received broadcast waves. The television set 100 also has a recording and reproducing function.

As illustrated in FIG. 1, the television set 100 comprises an antenna 112, an input terminal 113, a tuner 114, and a demodulator 115. The antenna 112 captures the broadcast waves of the digital broadcasting and supplies broadcast signals of the broadcast waves to the tuner 114 via the input terminal 113.

The tuner 114 selects a broadcast signal of a desired channel from the broadcast signals of the digital broadcasting input thereto. The broadcast signal output from the tuner 114 is supplied to the demodulator 115. The demodulator 115 subjects the broadcast signal to demodulation, demodulates a digital video signal and an audio signal, and supplies the demodulated signals to a selector 116 to be described later.

The television set 100 further comprises input terminals 121 and 123, an A/D converter 122, a signal processor 124, a speaker 125, and a video display panel 102.

The input terminal 121 receives inputs of an analog video signal and an analog audio signal from the outside. The input terminal 123 receives inputs of a digital video signal and a digital audio signal from the outside. The A/D converter 122 converts the analog video signal and the analog audio signal that are supplied from the input terminal 121 into corresponding digital signals and supplies the digital signals to the selector 116.

The selector 116 selects one of the digital video and audio signals supplied from the demodulator 115, the A/D converter 122, and the input terminal 123 and supplies the selected signal to the signal processor 124.

The television set 100 further comprises at least a TS multiplexer and an MPEG decoder. The signal processor 124 receives an input of a signal that has been decoded by the MPEG decoder. The signal processor 124 also receives an input of a signal that represents program data or moving-image data that is recorded in a hard disk drive (HDD) 130 or an external storage medium, such as a digital versatile disc (DVD) and a Blu-ray (registered trademark) disc, and subjected to decoding.

The signal processor 124 comprises an audio processor 1241 and a video processor 1242. The video processor 1242 subjects the input video signal to certain signal, scaling, and other types of processing and supplies the processed video signal to the video display panel 102. In addition, the video processor 1242 generates an on-screen display (OSD) signal to be displayed on the video display panel 102.

The audio processor 1241 subjects the input digital audio signal received from the selector 116 to predetermined signal processing, converts the digital audio signal into a corresponding analog audio signal, and outputs the analog audio signal to the speaker 125. The audio processor 1241 will be described in detail later. The speaker 125 receives an input of the audio signal supplied from the signal processor 124 and outputs audios using the audio signal. The audio processor 1241 in the first embodiment has a sound source separation function. The audio processor 1241 will be described in detail later.

The video display panel 102 comprises a flat panel display such as a liquid crystal display or a plasma display. The video display panel 102 displays videos using the video signals supplied from the signal processor 124.

The television set 100 further comprises a controller 127, an operator 128, a photoreceiver 129, the HDD 130, a memory 131, and a communication I/F 132.

The controller 127 integrally controls various operations in the television set 100. The controller 127 comprises a microprocessor that has, for example, a central processing unit (CPU) incorporated therein. The controller 127, while receiving an input of operation information from the operator 128, receives via the photoreceiver 129 an input of operation information transmitted from a remote controller 150. The controller 127 controls different modules using the foregoing operation information. The photoreceiver 129 in the first embodiment receives infrared light from the remote controller 150.

In this case, the controller 127 uses the memory 131. The memory 131 mainly comprises a read only memory (ROM) that stores a control program executed by the CPU incorporated in the controller 127, a random access memory (RAM) that provides the CPU with a work area, and a nonvolatile memory that stores, for example, various types of setting information and control information.

The HDD 130 has a function as a storage for storing the digital video signal and audio signal that are selected by the selector 116. The television set 100, because of the HDD 130 included therein, can record the digital video signal and audio signal selected by the selector 116 as recorded data in the HDD 130. Furthermore, the television set 100 can reproduce videos and audios using the digital video signal and audio signal recorded in the HDD 130.

The communication I/F 132 is connected to various types of communication devices (e.g., a server) via a public network 160. The communication I/F 132 can receive programs and services that can be used in the television set 100 and transmit various types of information.

Figure 2:
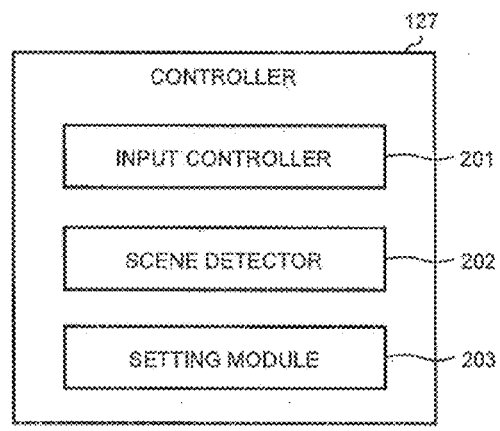
FIG. 2 is an exemplary block diagram of a functional configuration of a controller in the first embodiment.

The following describes a functional configuration executed by the controller 127. As illustrated in FIG. 2, the controller 127 in the first embodiment functions as an input controller 201, a scene detector 202, and a setting module 203.

The input controller 201 receives, via the photoreceiver 129, an operating input on the remote controller 150 performed by a user. The input controller 201 also receives an operating input on the operator 128. In the first embodiment, the input controller 201 receives from the user a setting input that specifies whether the sound source separation function is used and, when the sound source separation function is used, a setting input of a volume (strength of emphasis) of a voice and a background sound.

An audio signal is composed of a signal of a human voice component and a signal of a background sound component that represents, for example, music other than the human voice. The voice component signal will hereinafter be referred to a voice signal and the background sound component signal will hereinafter be referred to as a background sound signal. The sound source separation function is a function for separating the audio signal into the voice signal and the background sound signal and emphasizing either the voice signal or the background sound signal. The sound source separation function is performed by the audio processor 1241.

The scene detector 202 analyzes a video signal and an audio signal of moving-image data such as broadcast video or recorded video, detects a scene change that represents a changeover of scenes contained in the moving-image data, and outputs scene information as a detection result.

Specifically, the scene detector 202 mainly analyzes the audio signal of the moving-image data. The scene detector 202 then detects a silent portion of the audio signal to thereby detect a boundary between a main program scene and a CM scene in a program of the moving-image data. The CM is a scene other than the main program scene in which voice does not constitute a main part. Alternatively, the scene detector 202 analyzes the audio signal and detects a boundary between a song scene and a scene other than a song of the moving-image data. The scene detector 202 then outputs, as the scene detection result, the scene information that records a scene type, and a starting time-of-day and an ending time-of-day of the detected scene. The scene type indicates, for example, a main program scene, a CM scene, a song scene, and a scene other than a song.

The scene detection by the scene detector 202 may be performed dynamically in parallel with a display of broadcast video or reproduction of recorded video. Alternatively, the scene detection may be performed in advance before the reproduction of the recorded video and the scene information may be stored in the HDD 130. When the scene detection is performed dynamically, the scene detector 202 delivers the scene information to the audio processor 1241 upon each output of the scene information.

The setting module 203 makes various settings from the user and stores the settings in, for example, the HDD 130. In the first embodiment, the setting module 203 stores the setting of, for example, whether the sound source separation function is used, and the setting of the volume (degree of emphasis) of the voice and the background sound received by the input controller 201, in the HDD 130.

Figure 3:
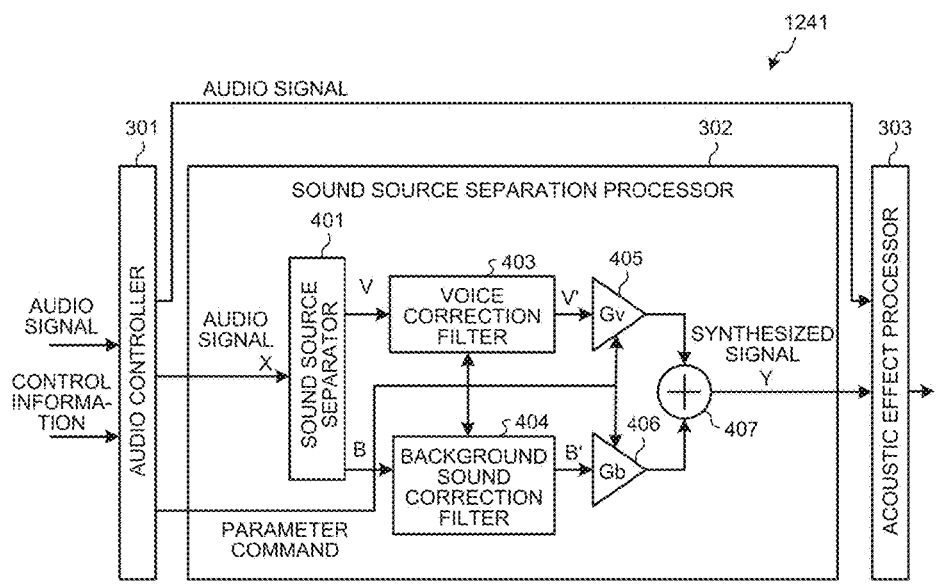
FIG. 3 is an exemplary diagram of a configuration of an audio processor in the first embodiment.

The following describes the audio processor 1241 of the signal processor 124 in detail. As illustrated in FIG. 3, the audio processor 1241 in the first embodiment comprises an audio controller 301, a sound source separation processor 302, and an acoustic effect processor 303.

The audio controller 301 receives an input of scene information as control information stored in the HDD 130 or scene information output from the scene detector 202 of the controller 127. The audio controller 301 controls, based on the scene information, performance of the sound source separation function by the sound source separation processor 302 for display of the scene.

Specifically, when the scene information includes a first scene such as a CM scene in which voice does not constitute a main part, the audio controller 301 controls the sound source separation processor 302 not to emphasize a voice signal during the display of the first scene. When the scene information includes a second scene such as a main program scene in which voice constitutes a main part, the audio controller 301 controls the sound source separation processor to emphasize the voice signal during the display of the second scene. The audio controller 301 determines whether the first scene and the second scene are being displayed, based on the starting time-of-day and the ending time-of-day of the scene recorded in the scene information.

The first scene is not limited to the CM scene, but is required only to contain data that is not mainly voice. Examples of the first scene include, but are not limited to, a scene other than a song. The second scene is not limited to the main program scene, but is required only to mainly contain voice. Examples of the second scene include, but are not limited to, a song scene.

The audio controller 301 outputs an audio signal input to the audio controller 301 to the acoustic effect processor 303 without having the sound source separation processor 302 intervening therebetween, to thereby disable the sound source separation function. Thereby, the audio controller 301 controls the sound source separation processor 302 not to emphasize the audio signal.

Furthermore, the audio controller 301 outputs the input audio signal to the sound source separation processor 302 to thereby enable the sound source separation function. Thereby, the audio controller 301 controls the sound source separation processor 302 to emphasize the audio signal.

When the audio controller 301 enables the sound source separation function, the audio controller 301 outputs a parameter command together with the audio signal to the sound source separation processor 302. This parameter command is a command for emphasizing or suppressing the voice or the background sound.

The sound source separation processor 302 separates an audio signal X into a voice signal and a background sound signal and performs the sound source separation function that emphasizes or suppresses the voice signal or the background sound signal. As illustrated in FIG. 3, the sound source separation processor 302 comprises a sound source separator 401, a voice correction filter 403, a background sound correction filter 404, a gain Gv 405, a gain Gb 406, and an adder 407.

The sound source separator 401 separates the input audio signal into a voice component V (a voice signal V) and a background sound component B (a background sound signal B). The sound source separator 401 may employ any technique for separating the audio signal. Examples of the technique for separating the audio signal employed by the sound source separator 401 include, but are not limited to, the technique disclosed in Japanese Patent Application Laid-open No. 2013-37152.

The voice correction filter 403 corrects a characteristic of the voice signal V on the basis of the parameter command and outputs a corrected voice signal V'. The background sound correction filter 404 corrects a characteristic of the background sound signal B on the basis of the parameter command and outputs a corrected background sound signal B'.

These correction filters 403 and 404 are available in a number of varieties, including a type that uses correlation between surround channels on the basis of a constant value (gain adjustment only). For example, a filter that emphasizes a voice frequency characteristic, as applied, for example, to a hearing aid may be used for the voice correction filter 403 to process the voice signal V, in order to make the voice alone easier to catch without affecting the background component. For the background sound correction filter 404, various other types of filters may be used, including a filter that strengthens a frequency band that has been excessively suppressed by the sound source separation process, a filter that applies an aural effect using a technique similar to a technique employed in an equalizer attached to, for example, a music player, and a filter that incorporates what is called a pseudo surround technology when the background sound signal is a stereo signal.

The corrected voice signal V' after the correction by the voice correction filter 403 is multiplied by the gain Gv 405. The corrected background sound signal B' after the correction by the background sound correction filter 404 is multiplied by the gain Gb 406.

The audio processor 1241 in the first embodiment causes the audio controller 301 to receive an input of the parameter command. The audio processor 1241 varies strength of the corrections made by the voice correction filter 403 and the background sound correction filter 404 according to the parameter command and varies the gain Gv 405 and the gain Gb 406 according to the parameter command. This operation results in the voice being emphasized or suppressed on the basis of the parameter command by the voice correction filter 403 and the gain Gv 405 and the background sound being emphasized or suppressed on the basis of the parameter command by the background sound correction filter 404 and the gain Gb 406.

The adder 407 adds the voice signal multiplied by the gain Gv 405 to the background sound signal multiplied by the gain Gb 406 and outputs a resultant synthesized signal Y.

The acoustic effect processor 303 applies various acoustic effects set by the user to the synthesized signal Y and outputs a resultant audio signal. Examples of the acoustic effects include, but are not limited to, surround effect and graphic equalizer.

Figure 4:
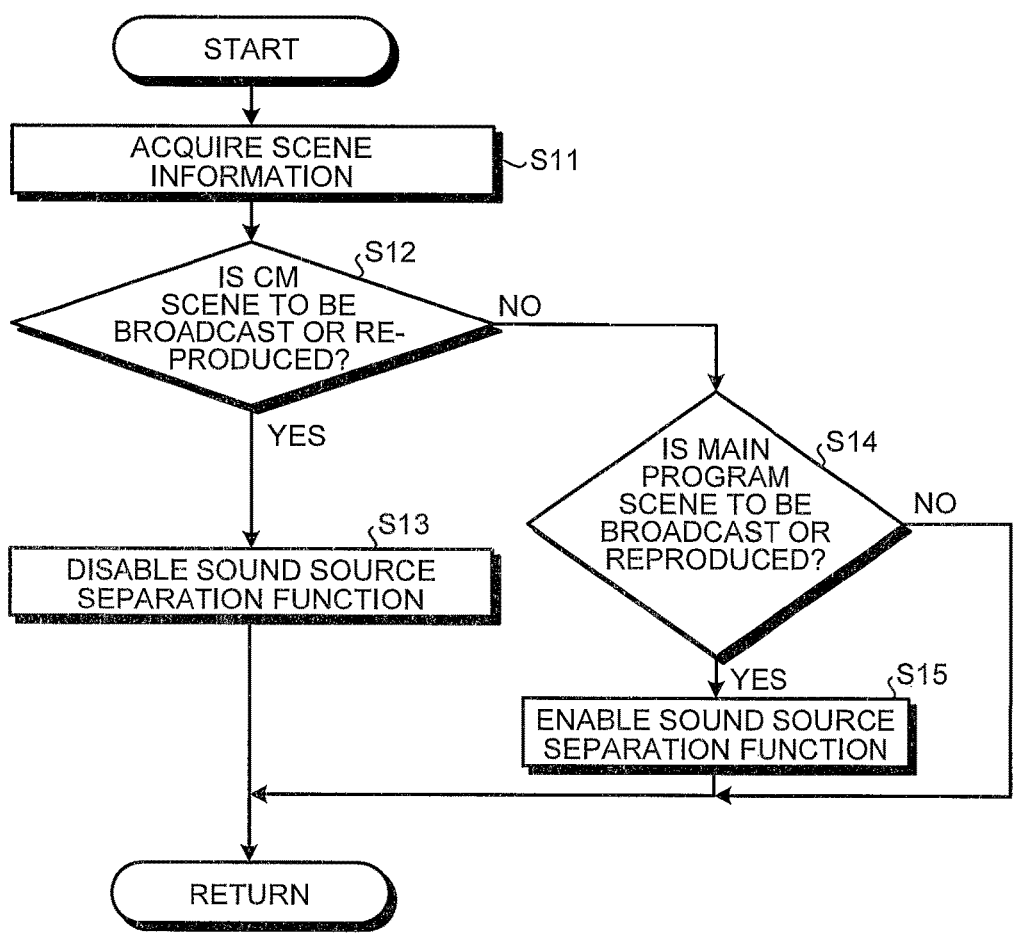
FIG. 4 is an exemplary flowchart illustrating steps of an audio control process in the first embodiment.

The following describes, with reference to FIG. 4, an audio control process performed by the television set 100 in the first embodiment having configurations as described above.

The audio controller 301 acquires from the HDD 130 or the scene detector 202 the scene information as the scene detection result to be displayed on the video display panel 102 (S11). The audio controller 301 analyzes details of the scene information and determines whether the scene to be displayed on the video display panel 102 upon arrival of the starting time-of-day, specifically, the scene to be now broadcast or reproduced is a CM scene on the basis of the scene type of the scene having the above starting time-of-day in the scene information (S12).

If the scene to be now broadcast or reproduced is a CM scene (Yes at S12), the audio controller 301 disables the sound source separation function (S13). Specifically, the audio controller 301 outputs the audio signal to the acoustic effect processor 303 without having the sound source separation processor 302 intervening therebetween. The process is then terminated.

If the scene to be now broadcast or reproduced is not a CM scene (No at S12), the audio controller 301 determines whether the scene in question is a main program scene (S14).

If the scene to be now broadcast or reproduced is a main program scene (Yes at S14), the audio controller 301 enables the sound source separation function (S15). Specifically, the audio controller 301 outputs, together with the audio signal, a parameter command for the voice correction filter 403 and the gain Gv 405 for emphasizing the voice signal to the sound source separation processor 302. The process is then terminated.

If the scene to be now broadcast or reproduced is not a main program scene at S14 (No at S14), the process is terminated.

Mounting the sound source separation function in the television set 100 allows the user to catch voice in a news program more easily or to set a state like karaoke in a music program by suppressing human voice singing a song therein. The sound source separation function, however, commonly requires that the user operate to switch between an enabled state and a disabled state of the sound source separation function. Even with the setting made to emphasize human voice in a news program, the sound source separation function set to be enabled is meaningless as soon as a CM starts. Users originally want to apply the sound source separation function to the main program scene of a program and are less likely to intend to apply the sound source separation function to the CM scene.

In a case where karaoke is set for a music program with the sound source separation function enabled, because this setting makes human voice less easy to catch in intervals between songs, the user needs to cancel the sound source separation function.

In the first embodiment, when the scene to be now broadcast or reproduced is a scene in which voice does not constitute a main part, as with the CM scene, as determined from the scene information, the audio controller 301 disables the sound source separation function and controls the sound source separation processor 302 not to emphasize the voice. Alternatively, in the first embodiment, when the scene to be now broadcast or reproduced is a scene in which voice constitutes a main part, as with the main program scene, the audio controller 301 enables the sound source separation function and controls the sound source separation processor 302 to emphasize the voice. Thus, the first embodiment prevents the user from failing in catching information from a CM scene by an unintentionally applied sound source separation function and enables natural viewing without the need to manually change the function.

The first embodiment allows the voice component to be adequately emphasized according to the scene using the sound source separation function. With the sound source separation function mounted on an electronic apparatus of, for example, the television set 100, the first embodiment can achieve an optimum sound source separation effect under an appropriate condition with no burden on the user.

In the first embodiment, the audio controller 301 controls whether to emphasize the audio signal based on whether to enable the sound source separation function, specifically, whether to output the audio signal received by the audio controller 301 to the sound source separation processor 302. The control of emphasis of the audio signal is not, however, limited to enabling or disabling the sound source separation function.

For example, not to emphasize the voice signal, the audio controller 301 may be configured so as to output the audio signal to the sound source separation processor 302 to thereby enable the sound source separation function and so as to output a parameter command that sets a 1 for the gain Gv 405 without changing the strength of the voice correction filter 403 to the sound source separation processor 302.

To emphasize the voice signal in this case, the audio controller 301 is configured, as in the above, so as to output the audio signal to the sound source separation processor 302 to thereby enable the sound source separation function and so as to output the parameter command that increases the strength of the voice correction filter 403 and the gain Gv 405 for emphasizing the voice signal to the sound source separation processor 302.

Second Embodiment

A television set 100 in a second embodiment controls the sound source separation function on the basis of a user's preference, program information, and subtitle information, in addition to performing the functions described with reference to the first embodiment.

The television set 100 and an audio processor 1241 in the second embodiment have configurations identical to those of the television set 100 in the first embodiment and the audio processor 1241 in the first embodiment.

Figures 5, 6:
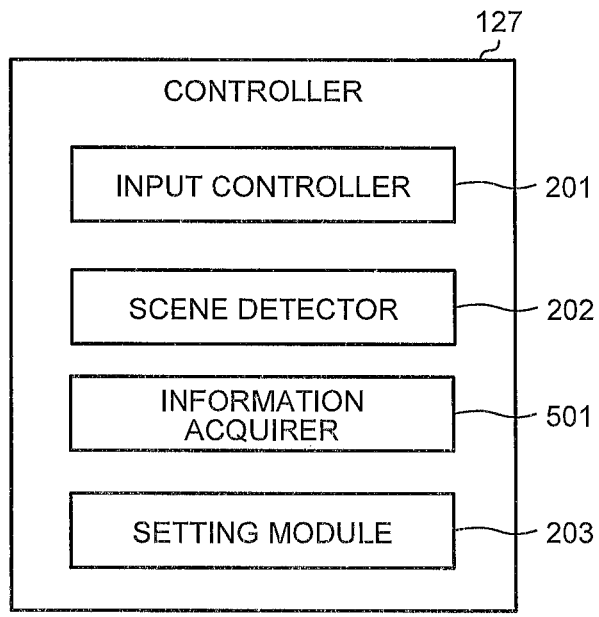
FIG. 5 is an exemplary block diagram of a functional configuration of a controller according to a second embodiment.
FIG. 6 is an exemplary diagram illustrating a preference setting screen in the second embodiment.

Reference is made to FIG. 5. A controller 127 in the second embodiment comprises an input controller 201, a scene detector 202, an information acquirer 501, and a setting module 203. The scene detector 202 has a function identical to the function achieved by the scene detector 202 in the first embodiment.

The second embodiment will be described for an exemplary case in which moving-image data of program video recorded in a HDD 130, a DVD, or a Blu-ray (a registered trademark) is reproduced.

In the second embodiment, the input controller 201 receives from the user an input of settings that specify a favorite character (a first character) for whom the user has strong preference and a non-favorite character (a second character) for whom the user has weak preference. Specifically, a video processor 1242 of a signal processor 124 displays a preference setting screen as an OSD on a video display panel 102.

As illustrated in FIG. 6, the preference setting screen allows the user to set a plurality of favorite characters and a plurality of non-favorite characters. The input controller 201 receives the input on the preference setting screen.

The setting module 203 saves the favorite characters and the non-favorite characters received by the input controller 201 as preference setting information in the HDD 130.

The information acquirer 501 acquires program information and subtitle information of, for example, recorded video to be now reproduced. The program information and the subtitle information may be acquired from the HDD 130 or a storage medium such as the DVD and the Blu-ray (a registered trademark), or through reception from, for example, a server on a network or a broadcast station. The information acquirer 501 delivers the program information and the subtitle information thus acquired to an audio controller 301 of the audio processor 1241.

The audio controller 301 of the audio processor 1241 in the second embodiment, while receiving an input of an audio signal, receives an input of the program information and the subtitle information of the moving-image data to be displayed on the video display panel 102 as control information from the information acquirer 501 of the controller 127.

The program information includes details, performers, a narrator, a cast, and other information of the program. The subtitle information includes the name of an utterer for each line, identification information (e.g., color) for identifying a specific utterer, and the like.

Using the information on the performers, the narrator, the cast, and the like of the program information in the program video, the audio controller 301 determines whether the favorite characters and the non-favorite characters recorded in the HDD 130 as the preference setting information will appear. Additionally, the audio controller 301 uses the utterer's name and the identification information included in the subtitle information to extract and identify utterances of the favorite characters and the non-favorite characters in the program video.

The audio controller 301 controls a sound source separation processor 302 to emphasize the voice signal during utterance of the favorite characters and not to emphasize the voice signal during utterance of the non-favorite characters.

Specifically, the audio controller 301 calculates a score indicative of preference for each of the indentified utterers. For example, the audio controller 301 sets 90 as the score for an utterer of the favorite characters and 10 as the score for an utterer of the non-favorite characters. The audio controller 301 further sets 50 as the score for an utterer who is recorded as neither the favorite characters nor the non-favorite characters in the preference setting information. Then, with 70 exemplarily defined as a first threshold and 30 exemplarily defined as a second threshold, the audio controller 301 controls the sound source separation processor 302 to emphasize the voice signal of the utterer having a score higher than the first threshold and to suppress the voice signal of the utterer having a score lower than the second threshold. It should be noted that these score values are only illustrative and not restrictive.

To emphasize the voice signal, the audio controller 301 outputs, together with the audio signal, the parameter command for the voice correction filter 403 and the gain Gv 405 for emphasizing the voice signal to the sound source separation processor 302. To suppress the voice signal, the audio controller 301 outputs, together with the audio signal, the parameter command for the voice correction filter 403 and the gain Gv 405 for suppressing the voice signal to the sound source separation processor 302.

Figure 7:
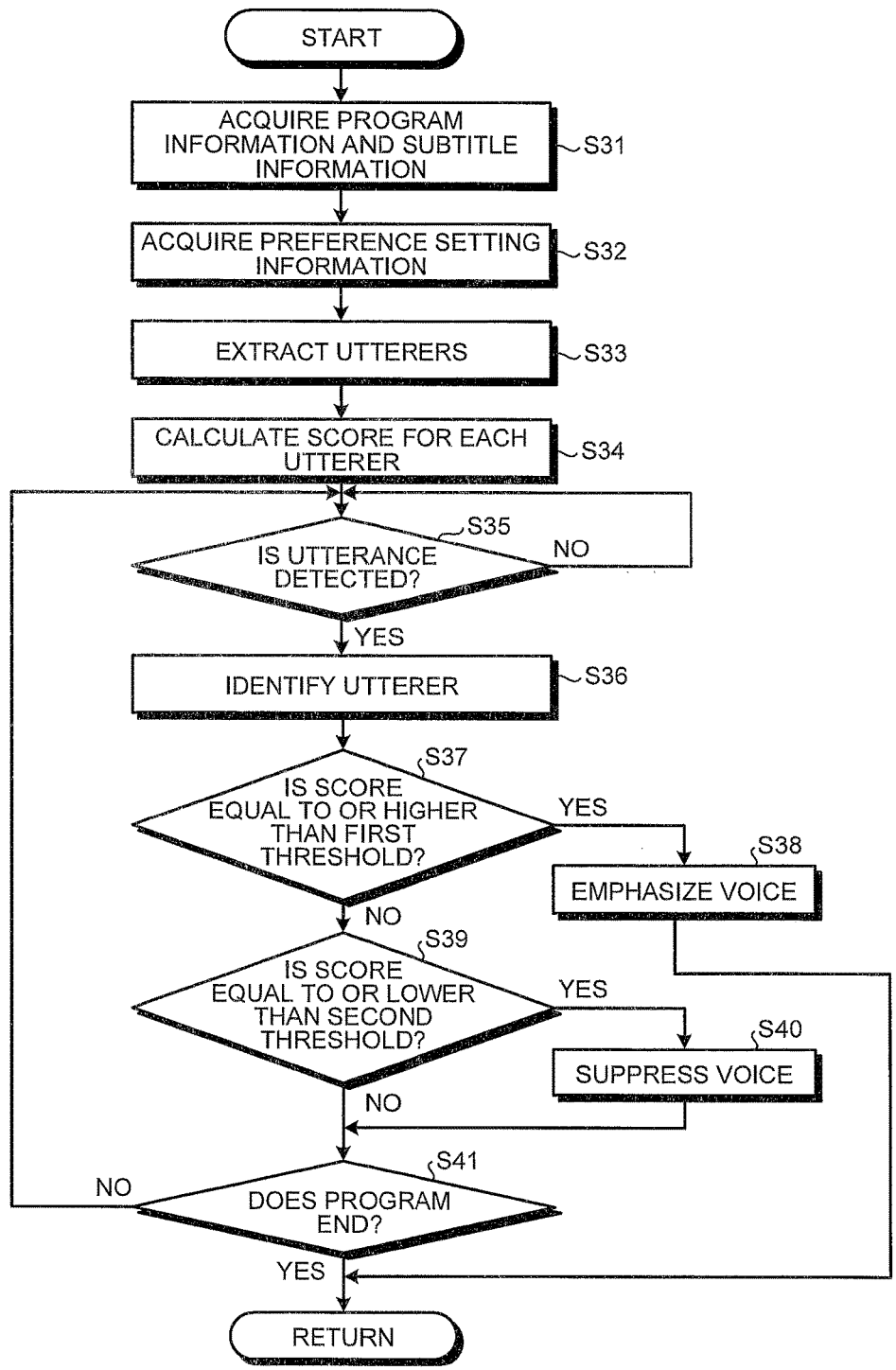
FIG. 7 is an exemplary flowchart illustrating steps of an audio control process in the second embodiment.

The following describes, with reference to FIG. 7, an audio control process performed by the television set 100 in the first embodiment having configurations as described above.

The audio controller 301 acquires from the information acquirer 501 of the controller 127 program information and subtitle information of the moving-image data program to be now reproduced (S31). The audio controller 301 acquires preference setting information of the user from the HDD 130 (S32).

The audio controller 301 extracts utterers from the favorite characters and the non-favorite characters recorded in the preference setting information, the program information, and the subtitle information (S33). The audio controller 301 then calculates the score for each of the identified utterers as described above (S34).

When reproduction of the program is started and an utterance is detected (Yes at S35), the audio controller 301 refers to the subtitle information and identifies the utterer on the basis of the name and identification information of the utterer (S36). The audio controller 301 further determines whether the score of the utterer calculated at S34 is equal to or higher than the first threshold (S37). If the score is equal to or higher than the first threshold (Yes at S37), the audio controller 301 controls the sound source separation processor 302 to emphasize the voice of the utterer (S38).

If it is determined at S37 that the score is lower than the first threshold (No at S37), the audio controller 301 then determines whether the score of the utterer is equal to or lower than the second threshold (S39). If the score is equal to or lower than the second threshold (Yes at S39), the audio controller 301 controls the sound source separation processor 302 to suppress the voice of the utterer (S40).

If it is determined at S39 that the score is higher than the second threshold (No at S39), the audio controller 301 does not control to emphasize or suppress the voice.

The steps from S35 to S41 are repeatedly performed for each utterance until the program ends (No at S41). When the program ends (Yes at S41), the process is terminated.

As described above, the television set 100 in the second embodiment controls the sound source separation function on the basis of user's preference, program information, and subtitle information. This arrangement allows the voice of a performer who does not suit the user's preference to be suppressed and the voice of a performer who suits the user's preference (favorite performer) to be emphasized during the display of the program video. Thus, with the sound source separation function mounted on an electronic apparatus of, for example, the television set 100, the second embodiment can achieve an optimum sound source separation effect under an appropriate condition with no burden on the user.

In the second embodiment, the user is allowed to specify a plurality of favorite characters and a plurality of non-favorite characters and, the audio controller 301 sets an identical score equal to or higher than the first threshold for the score of the user's favorite characters to thereby uniformly emphasize the voice of the favorite characters and an identical score equal to or lower than the second threshold for the score of the user's non-favorite characters to thereby uniformly suppress the voice of the non-favorite characters. This is, however, not the only possible approach.

For example, the characters in the preference setting screen may be prioritized and the audio controller 301 is configured so as to set higher scores for characters in higher order of priority. In this case, the audio controller 301 may be configured such that the degree of emphasis of voice is higher at higher score values and the degree of suppression of voice is lower at lower score values. Furthermore, in this case, the audio controller 301 may be configured so that the first threshold and the second threshold are not set.

In the second embodiment, the audio controller 301 uniformly sets a score that is lower than the first threshold and higher than the second threshold for an utterer who is registered as neither the favorite characters nor the non-favorite characters. This is, however, not the only possible approach.

For example, for an utterer who is registered as neither the favorite characters nor the non-favorite characters, the audio controller 301 may be configured so as to vary the score according to the cast of the character in the program information and detailed information of the program information including whether the character is, for example, a performer, a narrator, an MC, or an entertainer. In this case, the audio controller 301 may be configured so as to emphasize or suppress the voice according to the degree corresponding to the score for the utterer who is registered as neither the favorite characters nor the non-favorite characters, without having set the first threshold or the second threshold.

The second embodiment has been described for an exemplary case in which the moving-image data of program video recorded in a storage medium is reproduced. The television set 100 may nonetheless be configured so as to emphasize or suppress the voice of each utterer with respect to broadcast video received on a real-time basis. In this case, the television set 100 is provided with a sound source separation mode as a mode equivalent to what is called a time shift reproduction mode that reproduces data with a slight delay introduced in time relative to actual broadcast video.

The signal processor 124 is configured so as to reproduce the broadcast video at a slightly shifted timing in the sound source separation mode to thereby emphasize or suppress the voice signal for each utterer by the sound source separation function. Additionally, in this case, what is called live subtitle information that is prepared and transmitted on a real-time basis by, for example, a broadcast station can be used for the subtitle information. Through the foregoing techniques, an optimum sound source separation effect can be achieved under an appropriate condition with no burden on the user even for real-time broadcast videos.

Third Embodiment

A television set 100 in a third embodiment controls performance of the sound source separation function according to a setting of a subtitle display function made by the user, in addition to performing the functions described with reference to the first embodiment.

The television set 100 and an audio processor 1241 in the third embodiment have configurations identical to those of the television set 100 in the first embodiment and the audio processor 1241 in the first embodiment. A controller 127 in the third embodiment has a functional configuration identical to that of the controller 127 in the first embodiment.

In the third embodiment, an input controller 201 of the controller 127 receives an instruction issued by the user to set the subtitle display function. The setting of the subtitle display function may be either to turn ON or to turn OFF the subtitle display function. Turning ON the subtitle display function indicates that the subtitle display function is to be used and turning OFF the subtitle display function indicates that the subtitle display function is not to be used. A setting module 203 saves the setting of the subtitle display function received by the input controller 201 in a HDD 130.

An audio controller 301 of the audio processor 1241 acquires the setting of the subtitle display function saved in the HDD 130 as control information and controls performance of the sound source separation function on the basis of the setting of the subtitle display function.

Figure 8:
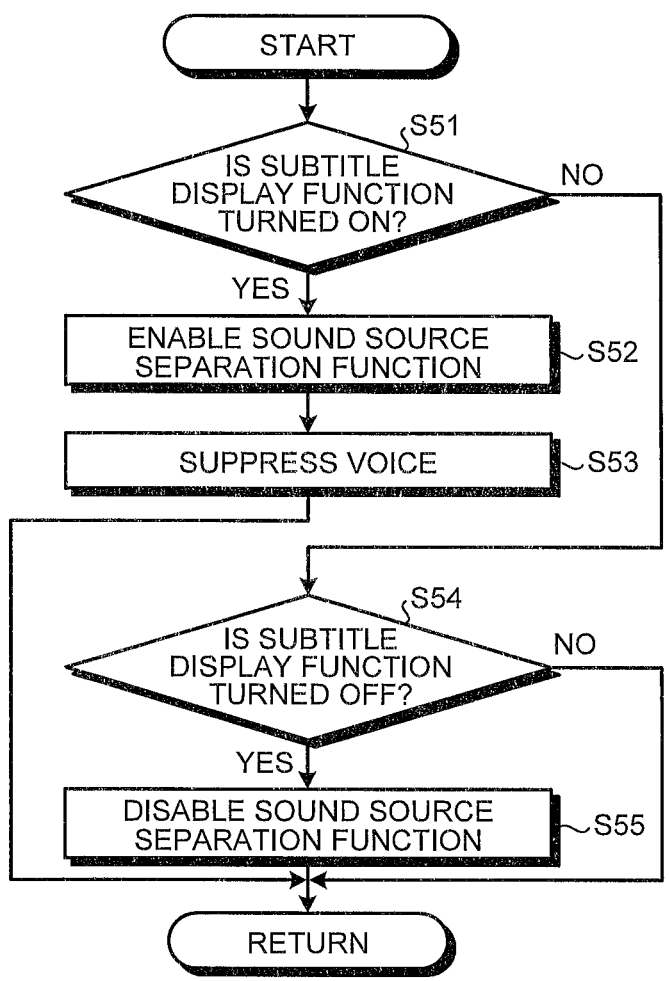
FIG. 8 is an exemplary flowchart illustrating steps of an audio control process according to a third embodiment.

The following describes, with reference to FIG. 8, details of an audio control process performed by the audio controller 301 in the third embodiment. The audio controller 301 determines whether the subtitle display function is set to ON (S51). If it is determined that the subtitle display function is set to ON (Yes at S51), the audio controller 301 enables the sound source separation function. The audio controller 301 outputs the audio signal to a sound source separation processor 302 (S52) and controls the sound source separation processor 302 to suppress the voice signal according to a parameter command (S53).

If it is determined that the subtitle display function is not set to ON (No at S51), the audio controller 301 then determines whether the subtitle display function is set to OFF (S54). If it is determined that the subtitle display function is set to OFF (Yes at S54), the audio controller 301 controls the sound source separation processor 302 not to emphasize the voice signal. Specifically, the audio controller 301 disables the sound source separation function and outputs the audio signal to an acoustic effect processor 303 without having the sound source separation processor 302 intervening therebetween (S55). As a result, the voice signal is not suppressed.

The user may want, even while suppressing human voice, to acquire a commentary or similar information during viewing of a program. In the third embodiment, the television set 100 controls the performance of the sound source separation function according to the setting made of the subtitle display function by the user. Specifically, if the user specifies to turn ON the subtitle display function, the audio controller 301 controls the sound source separation processor 302 to suppress the voice signal. If the user specifies to turn OFF the subtitle display function, the audio controller 301 controls the sound source separation processor 302 not to suppress the voice signal.

The third embodiment thus saves labor performed by the user in setting the subtitle display function and in setting the sound source separation function, facilitating the operation. As a result, with the sound source separation function mounted on an electronic apparatus of, for example, the television set 100, the third embodiment can achieve an optimum sound source separation effect under an appropriate condition with no burden on the user.

In the third embodiment, the audio controller 301 disables the sound source separation function to thereby control not to suppress the voice signal when the subtitle display function is set to OFF. This is, however, not the only possible technique not to suppress the voice signal. For example, the audio controller 301 may be configured so as to output the audio signal to the sound source separation processor 302 to thereby enable the sound source separation function. The audio controller 301 may further be configured so as to output a parameter command that sets a 1 for a gain Gv 405 without changing the strength of a voice correction filter 403 to the sound source separation processor 302 to thereby control the sound source separation processor 302 not to suppress the voice signal.

The second and third embodiments have been described to include also the function of controlling the sound source separation function on the basis of the scene information in the first embodiment. The second and third embodiments may nonetheless be configured to exclude such a function of the first embodiment.

An audio control program executed by the television set 100 in the first to fourth embodiments is provided as a computer program product by being incorporated in, for example, the ROM of the memory 131 in advance.

The audio control program executed by the television set 100 in the first to fourth embodiments may be provided as a computer program product by being recorded on a computer-readable recording medium, such as a CD-ROM, a flexible disk (FD), a CD-R, and a digital versatile disc (DVD), in a file in an installable format or an executable format.

The audio control program executed by the television set 100 in the first to fourth embodiments may also be configured as a computer program product stored in a computer connected to a network such as the Internet and downloaded over the network. The audio control program executed by the television set 100 in the first to fourth embodiments may still be configured as a computer program product provided or distributed over a network such as the Internet.

The audio control program executed by the television set 100 in the first to fourth embodiments has a modular configuration including the above-described components (the input controller 201, the scene detector 202, the setting module 203, the information acquirer 501, the audio controller 301, and the sound source separation processor 302). Each component is loaded onto the RAM of the memory 131 as a result of the CPU reading the audio control program from the ROM and executing the loaded audio control program.

Moreover, the various modules of the systems described herein can be implemented as software applications, hardware and/or software modules, or components on one or more computers, such as servers. While the various modules are illustrated separately, they may share some or all of the same underlying logic or code.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a sound source separation processor configured to perform a sound source separation function that separates an input audio signal into a voice signal and a background sound signal, which represents a signal of a background component other than voice, and emphasizes either the voice signal or the background sound signal; and
   an audio controller configured to
      control, based on scene information relating to a scene included in video, performance of the sound source separation function during display of the scene, and
      output a parameter command to the sound source separation processor, the parameter command including a parameter relating to emphasizing or suppressing the voice signal or the background sound signal, wherein
   the sound source separation processor includes
      a sound source separator configured to separate the input audio signal into the voice signal and the background sound signal;
      a voice correction filter configured to correct the voice signal on the basis of the parameter command and output a corrected voice signal;
      a background sound correction filter configured to correct the background sound signal on the basis of the parameter command and output a corrected background sound signal; and
      an adder configured to add a corrected voice signal multiplied by a gain based on the parameter command to a corrected background sound signal multiplied by a gain based on the parameter command and output a resultant synthesized signal.

2. The electronic apparatus according to claim 1, wherein, when the scene information includes a first scene in which voice does not constitute a main part, the audio controller disables the sound source separation processor during display of the first scene.

3. The electronic apparatus according to claim 1, wherein, when the scene information includes a second scene in which voice constitutes a main part, the audio controller controls the sound source separation processor to emphasize the voice signal during display of the second scene.

4. The electronic apparatus according to claim 1, wherein the audio controller adjusts a parameter for filtering processing performed by the sound source separation processor for the voice signal to control emphasis and suppression of the voice signal.

5. A control method by an electronic apparatus comprising:
   performing a sound source separation function that separates an input audio signal into a voice signal and a background sound signal, which represents a signal of a background component other than voice, and emphasizes either the voice signal or the background sound signal; and
   controlling, based on scene information relating to a scene included in video, performance of the sound source separation function, wherein
   the performing the sound source separation function includes
      separating the input audio signal into the voice signal and the background sound signal;
      correcting the voice signal on the basis of a parameter command and outputting a corrected voice signal, the parameter command including a parameter relating to emphasizing or suppressing the voice signal or the background sound signal;
      correcting the background sound signal on the basis of the parameter command and outputting a corrected background sound signal; and
      adding a corrected voice signal multiplied by a gain based on the parameter command to a corrected background sound signal multiplied by a gain based on the parameter command and outputting a resultant synthesized signal.

6. A computer program product having a non-transitory computer readable medium including programmed instructions, wherein the instructions, when executed by a computer, cause the computer to perform:
   performing a sound source separation function that separates an input audio signal into a voice signal and a background sound signal, which represents a signal of a background component other than voice, and emphasizes either the voice signal or the background sound signal; and
   controlling, based on scene information relating to a scene included in video, performance of the sound source separation function, wherein
   the performing the sound source separation function includes
      separating the input audio signal into the voice signal and the background sound signal;
      correcting the voice signal on the basis of a parameter command and outputting a corrected voice signal, the parameter command including a parameter relating to emphasizing or suppressing the voice signal or the background sound signal;
      correcting the background sound signal on the basis of the parameter command and outputting a corrected background sound signal; and
      adding a corrected voice signal multiplied by a gain based on the parameter command to a corrected background sound signal multiplied by a gain based on the parameter command and outputting a resultant synthesized signal.

* * * * *